(12) United States Patent
Kong

(10) Patent No.: US 6,925,472 B2
(45) Date of Patent: Aug. 2, 2005

(54) TREE STRUCTURE TO PASS DATA VALUES TO PREPARED STATEMENT OBJECT

(75) Inventor: James X. Kong, Castrovalley, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 409 days.

(21) Appl. No.: 09/902,274

(22) Filed: Jul. 11, 2001

(65) Prior Publication Data

US 2003/0018645 A1 Jan. 23, 2003

(51) Int. Cl.⁷ .................................................. G06F 17/30
(52) U.S. Cl. ........................... 707/104; 707/3; 707/100; 707/101; 707/103
(58) Field of Search ........................... 707/3, 100, 101, 707/102, 103, 104, 2, 5

(56) References Cited

U.S. PATENT DOCUMENTS

| | | | | |
|---|---|---|---|---|
| 5,313,630 A | * | 5/1994 | Namioka et al. ....... | 707/103 R |
| 5,560,007 A | * | 9/1996 | Thai ............................... | 707/3 |
| 5,666,528 A | * | 9/1997 | Thai ............................. | 707/102 |
| 5,812,840 A | | 9/1998 | Shwartz ....................... | 395/604 |
| 5,826,077 A | * | 10/1998 | Blakeley et al. ............... | 707/4 |
| 5,924,088 A | | 7/1999 | Jakobsson et al. ............. | 707/2 |
| 6,018,743 A | | 1/2000 | Xu ............................... | 707/103 |
| 6,119,125 A | * | 9/2000 | Gloudeman et al. .... | 707/103 R |
| 6,339,768 B1 | * | 1/2002 | Leung et al. ................... | 707/2 |
| 6,356,887 B1 | * | 3/2002 | Berenson et al. .............. | 707/2 |
| 2002/0023090 A1 | * | 2/2002 | McGeachie ................. | 707/102 |
| 2002/0198902 A1 | * | 12/2002 | Sankaran et al. ........... | 707/203 |

* cited by examiner

Primary Examiner—Jean M. Corrielus
(74) Attorney, Agent, or Firm—Kent A. Lembke; William J. Kubida; Hogan & Hartson LLP

(57) ABSTRACT

A method of processing a query in a system in an object oriented programming environment, includes using a code to create a condition filter in a standard query language statement, the condition filter defining properties to be satisfied by a result of the query, and the condition filter using an object to execute a precompiled query language statement, and sending the standard query language statement to a database.

13 Claims, 1 Drawing Sheet

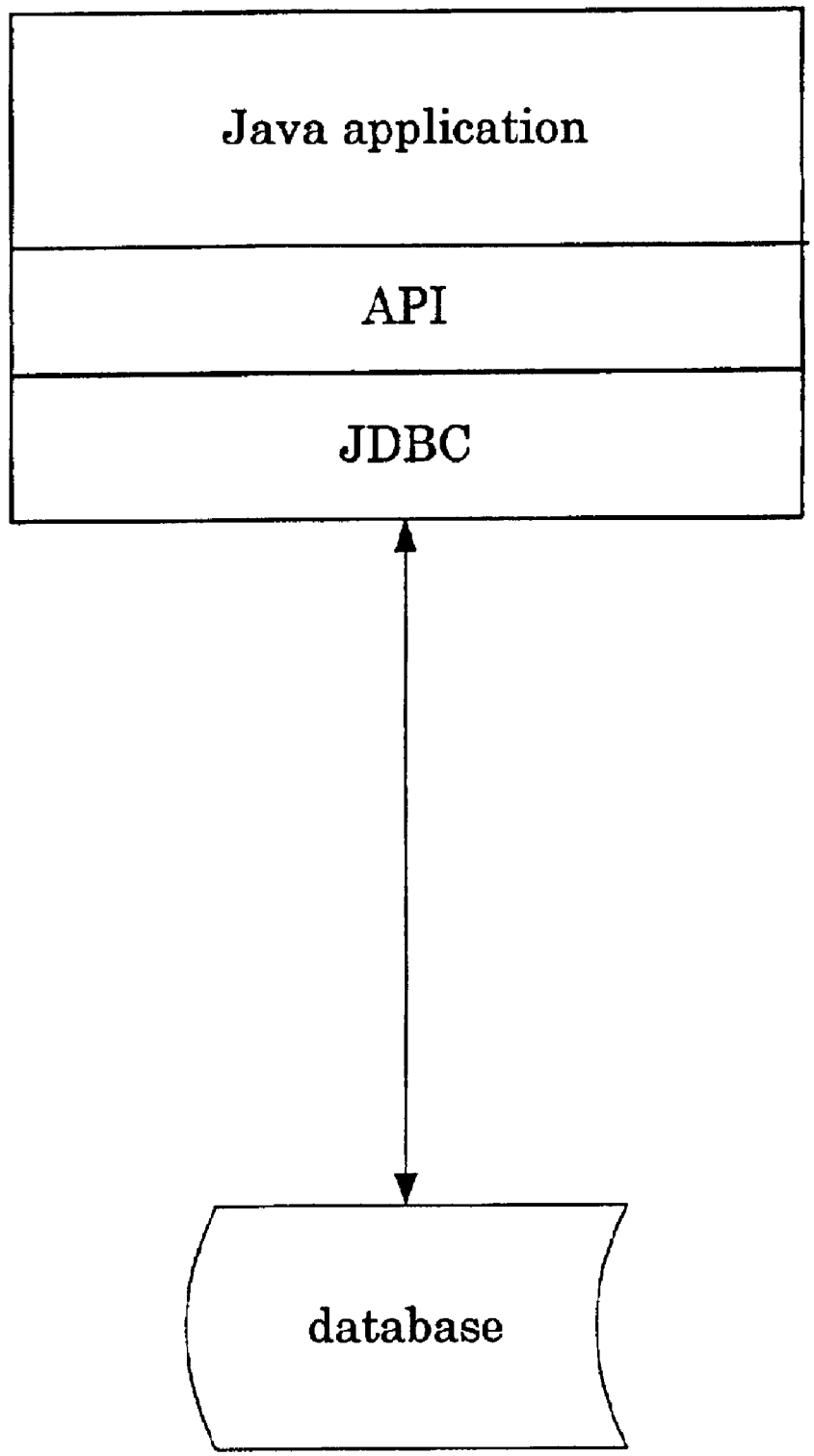

TREE STRUCTURE TO PASS DATA VALUES TO PREPARED STATEMENT OBJECT

BACKGROUND OF THE INVENTION

1. Field of the Invention

The present invention relates to an application programming interface (API), and more particularly, to an application programming interface with a tree structure to pass data values to a prepared statement object.

2. Discussion of the Related Art

A JDBC (Java Database Connectivity) provides connection for programs written in Java to the data in common databases. The JDBC permits encoding of access request statements in SQL (structured query language). The SELECT statement in the SQL statement includes 3 clauses—SELECT, FROM, and WHERE.

Conventionally, an API uses a string filter to create a SQL WHERE clause as a string and pass it to persistent object framework (POF). Then, in the persistent object framework, a JDBC Statement object is used to request a query to get the result data from a database. The Statement object is an object used for executing a simple SQL statement and obtaining the results produced by it. However, the Statement object needs to be compiled each time it is being used since it does not store the compiled results.

SUMMARY OF THE INVENTION

Accordingly, the present invention is directed to an application programming interface (API) that is an improvement of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of processing a query in a system in an object oriented programming environment, comprising:

using a code to create a condition filter in a standard query language statement, the condition filter defining properties to be satisfied by a result of the query, and the condition filter using an object to execute a precompiled query language statement; and sending the standard query language statement to a database.

In another aspect of the present invention, a method of processing a query in a system in an object oriented programming environment, comprising: using an application programming interface (API) to create a standard query language (SQL) WHERE clause statement in a SQL statement and to pass the SQL WHERE clause statement to a persistent object framework (POF); and sending the SQL statement to a database, wherein the SQL WHERE clause statement includes a condition filter and uses a PreparedStatement object to request the query.

In another aspect of the present invention, an application programming interface (API) for a database query system in an object oriented programming environment, the application programming interface adapted to effect the steps comprising: creating a condition filter for a standard query language (SQL) WHERE clause statement; and passing the condition filter to a persistent object framework, wherein the SQL WHERE clause statement uses a PreparedStatement object to request a query.

In another aspect of the present invention, a computer program product comprising a computer useable medium having computer readable code embodied therein for a database query, the computer program product adapted to effect the steps comprising: making a connection with a database; using a code to create a condition filter in a standard query language statement, the condition filter defining properties to be satisfied by a result of the query, and the condition filter using an object to execute a precompiled query language statement; and sending the standard query language statement to the database.

In another aspect of the present invention, A computer program product comprising a computer useable medium having computer readable code embodied therein for a database query, the computer program product comprising: means for using a code to create a condition filter in a standard query language statement, means in the condition filter for defining properties to be satisfied by a result of the query, and means in the condition filter for using an object to execute a precompiled standard query language statement.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide further understanding of the invention and is incorporated in and constitutes a part of this specification, illustrates an embodiment of the invention and together with the description serves to explain the principles of the invention. In the drawing:

The FIG. 1 is a block diagram showing database access with an interface according to the present invention.

DETAILED DESCRIPTION OF THE PREFERRED EMBODIMENTS

Reference will now be made in detail to the preferred embodiment of the present invention, examples of which are illustrated in the accompanying drawings.

The FIGURE illustrates database access with the API (application programming interface) of the present invention.

The FIGURE shows a Java application, an API of the present invention, a database, and a JDBC for connecting the Java application to the database. The API of the present invention creates a condition filter for SQL WHERE clause statement that uses a JDBC PreparedStatement object in a persistent object framework (POF). The PreparedStatement object is an object that represents a precompiled SQL statement. The SQL statement is pre-compiled and stored in the PreparedStatement object. Thus, the PreparedStatement object can be used to efficiently execute the statement multiple times. The SQL statement contained in the PreparedStatement object can take one or more parameters as input arguments (IN parameters). The IN parameter is a parameter whose value is not specified when the SQL statement is created. The PreparedStatement object has a question mark ("?") as a placeholder for each IN parameter. An application has to set a value for each question mark in a PreparedStatement object before executing the PreparedStatement. The PreparedStatement object has the potential to be more efficient than the Statement object because it has been pre-compiled and stored for future use. For that reason, a SQL statement that is executed many times may be created as a PreparedStatement object to increase efficiency.

The classes for the API of the present invention are described now.

CXPFilter class: This class is a base class to construct the condition filter for SQL WHERE clause to be used to create a JDBC PreparedStatement object. The data values in conditions will be replaced with '?' and the corresponding data value list will also be created. The order of data values in the list is the same as the order of '?' in the WHERE clause. Therefore, it is easy to use PreparedStatement.set( ) functions to set the data values. This class uses a tree data structure to store conditions internally. Following are characteristics of the CXPFilter:

Types of condition operators: =, !=, >, <, >=, <=
Types of condition column values: String, Integer, Long, Boolean, BigDecimal, Date
Type of LIKE condition operation: LIKE
Types of null checking functions: IS NULL, IS NOT NULL
Types of case functions: UPPER, LOWER, INITCAP
TO_DATE function: TO_DATE
Types of logic operations: AND, OR
Formats of conditions:
  Normal condition:
    <column_name>condition_operator<column_value>
    <table_name.column_name>condition_operator<column_value>
  Like condition:
    <column_name>LIKE<matching_pattern>
    <table_name.column_name>LIKE<matching_pattern>
  Null checking condition:
    <column_name>IS NULL
    <table_name.column_name>IS NULL
    <column_name>IS NOT NULL
    <table_name.column_name>IS NOT NULL
  Case function condition:
    case_function(<column_name>) condition_operator case_function(<column_value>)
    case_function(<table_name.column_name>) condition_operator case_function(<column_value>)
  TO DATE function condition:
    <column_name>condition_operator TO_DATE(<column_value>, <date_format>)
    <table_name.column_name>condition_operator TO_DATE(<column value>, <date_format>)
Class API:

```
public class CXPFilter
{
    // Condition operators
    static public final String COND_OPER_EQUAL = "=";
    static public final String COND_OPER_NOT_EQUAL = "! =";
    static public final String COND_OPER_GREAT = ">";
    static public final String COND_OPER_LESS = "<";
    static public final String COND_OPER_GREAT_EQUAL =">=";
    static public final String COND_OPER_LESS_EQUAL = "<=";
    //Null operators
    static public final String NULL_OPER_NULL = "IS NULL";
    static public final String COND_OPER_NOT_NULL = "IS NOT NULL";
    //Logic operators
    static public final String LOGIC_OPER_AND = "AND";
    static public final String LOGIC_OPER_OR = "OR";
    //Case function name
    static public final String CASE_FUNCTION_LOWER = "LOWER";
    static public final String CASE_FUNCTION_UPPER = "UPPER";
    static public final String CASE_FUNCTION_INITCAP = "INITCAP";
    public String getFilterStringForPreparedStmt ( ) throws CXException;
        //Traverses the condition tree and return a filter string with
        // '?' replacing the corresponding data values for WHERE
        // clause for JDBC PreparedStatement object,
    public string getFilterString ( ) throws CXException;
        // Used for debugging only. It traverses the condition tree
        // and return a filter string for WHERE clause. Comment the
        // statement where calls this function after you finish
        // debugging. Otherwise, it will impact the performance of the
        // application.
    public ArrayList getValueList ( ) throws CXException;
        // Traverse the condition tree and return a data value list.
        // The order of data values in the list is the same as the
        // order of '?' in the WHERE clause.
}
```

CXPNormalFilter class: The CXPNormalFilter is a derived class of the CXPFilter. This class constructs a normal condition filter for SQL WHERE clause to be used to create a JDBC PreparedStatement object. None of parameters in the CXPNormalFilter can be null. The characteristics of the CPXNormalFilter are as follows:

Types of condition operator: =, !=, >, <,>=, <=
Types of condition column values: String, Integer, Long, Boolean, BigDecimal, Date
Format of condition:
  <column_name>operator<column_value>

<table_name.column_name>operator<column_value>
Class API:

```
public class CXPNormalFilter extends CXPFilter
{
    public CXPNormalFilter (String columnName, String operator, Object value) throws CXException;
}
```

Note that none of the parameters can be "null".

CXPLikeFilter Class: The CXPLikeFilter is another derived class of the CXPFilter. This class constructs a LIKE condition filter for SQL WHERE clause to be used to create a JDBC PreparedStatement object. None of parameters in the CXPLikeFilter can be null. The characteristics of the CPXLikeFilter are as follows:

Types of condition operators: LIKE
Types of condition column values: String
Format of condition:
   <column_name>LIKE<matching_pattern>
   <table_name.column_name>LIKE<matching_pattern>
Class API:

```
public class CXPLikeFilter extends CXPFilter
{
    public CXPLikeFilter (String, columnName, String pattern) throws CXException;
}
```

Note that none of the parameters can be "null".

CXPIsNullFilter Class: The CXPIsNullFilter is another derived class of CXPFilter. This class constructs a IS NULL condition filter for SQL WHERE clause to be used to create a JDBC PreparedStatement object. None of parameters in the CXPIsNullFilter can be null. The characteristics of the CPXIsNullFilter are as follows:

Types of IS NULL functions: IS NULL, IS NOT NULL
Format of condition:
   <column_name>IS NULL
   <table_name.column_name>IS NULL
   <column_name>IS NOT NULL
   <table_name.column_name>IS NOT NULL
Class API:

```
public class CXPIsNullFilter extends CXPFilter
{
    public CXPIsNulLFilter (String columnName, String operator) throws CXException;
}
```

Note that none of parameters can be "null".

CXPCaseFilter Class: The CXPCaseFilter is another derived class of CXPFilter. This class constructs a case condition filter for SQL WHERE clause to be used to create a JDBC PreparedStatement object. None of parameters in the CXPCaseFilter can be null. The characteristics of the CPXCaseFilter are as follows:

Types of condition operators: =, !=,>, <, >=, <=
Types of case function: UPPER, LOWER, INITCAP
Types of condition column values: String
Format of condition:
   case_function(<column_name>) condition_operatorcase_function (<column_value>)
   case_function(<table_name.column_name>) condition_operator case_function (<column_value>)
Class API:

```
public class CXPCaseFilter extends CXPFilter
{
    public CXPCaseFilter (String, columnName, String operator, String value, String caseFunc) throw CXException;
}
```

Note that none of parameters can be "null".

CXPToDateFilter Class: The CXPToDateFilter is another derived class of CXPFilter. This class constructs a To_DATE condition filter for SQL WHERE clause to be used to create a JDBC PreparedStatement object. None of parameters in the CXPToDateFilter can be null. The characteristics of the CPXToDateFilter are as follows:

Types of condition operators: =, !=, >, <, >=, <=
Types of condition values: String
Format of condition:
   <column_name>condition_operator TO_DATE (<column_value>,<date_format>)
   <table_name.column_name>condition_operator TO DATE (<column_value>, <date_format>)
Class API:

```
public class CXPToDateFilter extends CXPFilter
{
    public CXPToDateFilter (String columnName, String operator, String dateStr, String dateFormat) throws CXException;
}
```

Note that none of parameters can be "null".

CXPLogicFilter Class: The CXPLogicFilter is another derived class of CXPFilter. This class constructs a logic condition filter for SQL WHERE clause to be used to create a JDBC PreparedStatement object. The characteristics of the CXPLogicFilter are as follows:

Types of logic operators: AND, OR
Format of condition: <filter1>logic_operator <filter2>
Class API:

```
public class CXPLogicFilter extends CXPFilter
{
```

```
          public CXPLogicFilter (CXPFilter, filter1, String operator,
            CXPFilter filter2) throws CXException;
        }
```

CXPQuery Class: The CXPQuery is also used in the API discussed as the related art. In the present invention, a line "void setFilter (CXPFilter, filter);" is added to the CXPQuery used in the API discussed as the related art.

Following are examples for using the API of the present invention.

EXAMPLE 1

Target

Create a filter using all data value types: ((((employee.name='John' OR employee.name='George') AND (employee.age<30 OR employee.birthday>'Jul. 17, 1971')) AND (employee.salary>100000 OR employee.bouns>20000)) AND employee.married=0)

Code

```
...
CXPContext context=CXRequestContext.getP0Context ( );
CXPQuery query=context.createQuery ("employee");
...
String name1="John";
String name2="George"
Integer age=new Integer (30);
Date birthday=new Date ("Jul. 17, 1971");
Long salary=new Long (100000);
BigDecimal bonus=new BigDecimal (20000);
Boolean Married=new Boolean (false);
CXPFilter filter1=new CXPNormalFilter ("employee.name", CXPFilter.COND_OPER_EQUAL, name1);
CXPFilter filter2=new CXPNormalFilter ("employee.name", CXPFilter COND_OPER_EQUAL, name2)
CXPFilter filter3=new CXPLogicFilter (filter1, CXPFilter.LOGIC_OPER_OR, filter2);
filter1=new CXPNormalFilter ("employee.age", CXPFilter.COND_OPER_LESS,age);
filter2=new CXPNormalFilter ("employee.birthday", CXPFilter.COND_OPER_GREAT, birthday);
CXPFilterfilter4=new CXPLogicFilter (filter1, CXPFilter.LOGIC_OPER_OR, filter2);
CXPFilterfilter 5=new CXPLogicFilter (filter3, CXPFilter.LOGIC_OPER_AND_, filter4);
filter1=new CXPNormalFilter ("employee.salary", CXPFilter.COND_OPER_GREAT, salary);
filter2=new CXPNormalFilter ("employee bonus", CXPFilter.COND_OPER_GREAT, bonus);
filter3=new CXPLogicFilter (filter1, CXPFilter.LOGIC_OPER_OR, filter2)
filter4=new CXPLogicFilter (filter5, CXPFilter.LOGIC_OPER_AND, filter3)
CXPFilter filter =new CXPLogicFilter (filter4, CXPFilter.LOGIC_OPER_AND, filter1);
System.out.println ("filter:"+filter.getFilterString ( )); // Remove it after debugging!!!
System.out.println ("filterPS:"+ filter.getFilterStringForPreparedStmt ( )); // Remove it after debugging!!!
query.setFilter (filter);
query.begin ( );
...
```

Output filter ((((employee.name='John' OR employee.name='George') AND (employee.age<30 OR employee.birthday>'Sat Jul 17 00:00:00 PDT 1971')) AND (employee.salary>100000 OR employee.bonus>20000)) AND employee.married=0)

filterPS: ((((employee.name=? OR employee.name=?) AND (employee.age<?OR employee.birthday>?)) AND (employee.salary>?OR employee.bonus>?)) AND employee.married=?)

EXAMPLE 2

Target

Use the new API with UPPER function in java.

Original Code

```
...
CXPContext unitContext=CXRequestContext.getPOContext( );
CXPQuery query=unitContext.createQuery ("unit");
query.setNativeFilter ("code='"+code+"'"+"and ((owner_handle='"+owner_id+"')"+"OR (UPPER (owner_handle)=UPPER 'system@0')))");
...
query.begin ( );
...
```

New Code

```
...
CXPContext.unitContext=CXRequestContext.get.Context ( );
CXPQuery query =unitContext.createQuery ("unit");
CXPFilter filter1=new CXPNormalFilter ("owner_handle", CXPFilter.COND_OPER_EQUAL, owner_id);
CXPFilter filter2=new CXPCaseFilter ("owner_handle", CXPFilter.COND_OPER_EQUAL, "system@0", CXPFilter.CASE_FUNCTION_UPPER);
CXPFilter3filter3=new CXPLogicFilter (filter1, CXPFilter.LOGIC_OPER_OR, filter2);
filter1=new CXPNormalFilter ("code", CXPFilter.COND_OPER_EQUAL, code);
filter2=new CXPLogicFilter (filter1, CXPFilter.LOGIC_OPER_AND, filer3);
System.out.println ("filterPS:"+ filter2.getFilter.StringForPreparedStmt ( )); // Remove it after debugging!!!
query.setFilter (filter2);
...
query.begin ( );
...
```

Output (code=? AND (owner_handle=? OR UPPER (owner_handle)=UPPER (?)))

EXAMPLE 3

Target
Use the new API with TO_DATE function in PriceList.getPriceListRows ( ) in actrasrc/modeles/oms2/com/netscape/oms2/pricing/PriceList.java.
Original Code
. . .

```
CXPContext poContext=
    CXRequestContext.getPOContext ( );
CXPQuery query=poContext.createQuery ("price_list_
    row_view");
. . .
Calendar cal=Calendar.getInstance ( );
String dateString=new SimpleDateFormat ("yyyy-MM-
    dd hh:mm:ss") .format (cal.getTime ( ));
query.setNativeFilter ("price_list_header_id="+
    String.valueOf (headerId)+"AND is_active="+
    String.valueOf (OMSData.DB_TRUE)+"AND NVL
    (effective_date, TO_DATE ('0001-01-01 00:00:00',
    'YYYY-MM-DD HH24:MI:SS'))"+"<=TO_DATE
    ("'+dateString +"', 'YYYY-MM-DD HH24:MI:SS')"+
    "AND NVL (expiration_date, TO_DATE ('4712-12-
    31 23:59:59', 'YYYY-MM-DD HH24:MI:SS'))"+
    ">TO_DATE ("'+dateString +"', 'YYYY-MM-DD
    HH24:MI:SS')"+"AND pricing_identifier='"+
    pricingIdentifier+"'");
query.begin ( );
. . .
```

New Code
. . .

```
CXPContext poContext=
    CXREquestContext.getPOContext ( );
CXPQuery query=poContext.createQuery ("price list
    row_view");
. . .
Calendar cal=Calendar.getInstance ( );
String dateString=new SimpleDateFormat ("yyyy-MM-
    dd hh:mm:ss") .format (cal.getTime ( ));
Boolean isActive=new Boolean (true);
CXPFilter filter1=new CXPNormalFilter (price_list_
    header_id", CXPFilter.COND_OPER_EQUAL,
    String.valueOf (headerId));
CXPFilter filter2=new CXPNormalFilter ("is_active",
    CXPFilter.COND_OPER_EQUAL, isActive);
CXPFilter filter3=new CXPLogicFilter (filter1,
    CXPFilter.LOGIC_OPER_AND, filter2);
String column="NVL (effective_date, TO_DATE
    ('0001-01-0100:00:00', 'YYYY-MM-DD
    HH24:MI:SS'))";
filter1=new CXPToDateFilter (column, "<=", date.String,
    "YYYY-MM-DD HH24:MI:SS");
filter2=new CXPLogicFilter (filter3, CXPFilter.LOGIC_
    OPER_AND, filter1);
column="NVL (expiration_date, TO_DATE ('4712-12-
    3123:59:59', 'YYYY-MM-DD HH24:MI:SS'))";
filter1=new CXPToDateFilter (column, ">", dateString,
    "YYYY-MM-DD HH24:MI:SS');
filter3=new CXPLogicFilter (filter2, CXPFilter.LOGIC_
    OPER_AND, filter1)
filter1=new CXPNormalFilter ("pricing_identifier",
    CXPFilter.COND_OPER_EQUAL,
    (pricingIdentifier);
filter2=new CXPLogicFilter (filter3, CXPFilter.LOGIC_
    OPER_AND, filter1)
System.out.println ("filterPS:"+
    filter2.getFilterStringForPreparedStmt ( )); // Remove
    it after debugging!!!
query.setFilter (filter2);
query.begin ( );
. . .
```

Output
((((price list_header_id=? AND is_active=?) AND NVL (effective_date, TO_DATE ('0001-01-0100:00:00', 'YYYY-MM-DD HH24:MI:SS'))<=
TO_DATE (?, 'YYYY-MM-DDHH24:MI:SS')) AND "NVL (expiration_date, TO_DATE ('4712-12-3123:59:59', 'YYYY-MM-DD HH24:MI:SS'))>
TO_DATE (? 'YYYY-MM-DDHH24:MI:SS')) AND pricing_identifier=?)

By using the API of the present invention, an application performance for database accessing can be improved since the PreparedStatement is used. Moreover, with the API of the present invention, different SQL WHERE clauses can be easily formed, thus a flexible JDBC can be provided.

It will be apparent to those skilled in the art that various modifications and variations can be made in the application programming interface (API) of the present invention without departing from the spirit or scope of the invention. Thus, it is intended that the present invention covers the modifications and variations of this invention provided that they come within the scope of any claims and their equivalents.

What is claimed is:

1. A database implemented method of processing a query in an object oriented programming environment, comprising:

using a base class to create a condition filter in a standard query language statement, the condition filter defining properties to be satisfied by a result of a query, wherein said condition filter includes parameters and none of the parameters is null, wherein a portion of data values in the condition filter are each replaced by a placeholder and a corresponding data value list for the placeholders is created using a tree data structure to store condition filter, and wherein the placeholder is a question mark character;

precompling the standard query language statement including the condition filter:

storing the precompiled standard query language statement;

receiving the query from an application including values for each of the data values represented by placeholders; and using the precompiled standard language statement including the received values from the application to request the result of the query from said database, wherein the precompiled query language statement is executed multiple times without being recompiled.

2. The method of processing a query according to claim 1, wherein condition filter includes LIKE, AND, and OR operators.

3. The method of processing a query according to claim 1, wherein the condition filter includes one of IS NULL and IS NOT NULL functions.

4. The method of processing a query according to claim 1, wherein the condition filter includes one of UPPER, LOWER, and INITCAP functions.

5. The method of processing a query according to claim 1, wherein the condition filter comprises TO_DATE function.

6. A database implemented method of processing a query in an object oriented programming environment, comprising:

using an application programming interface (API) to create a standard query language (SQL) WHERE clause statement in the SQL statement and to pass the SQL WHERE clause statement to a persistent object framework (POF), wherein the API uses a tree data structure for storing conditions wherein data values of unknown parameters in the SQL WHERE clause statement are replaced with a question mark character and a corresponding data value list is created;

receiving a query from said application programming interface; and sending the SQL WHERE clause statement to the database, wherein the SQL WHERE clause statement includes a condition filter and uses a PreparedStatement object that uses the tree data structure to set values of the unknown parameters unknown, and wherein the SQL WHERE clause statement is executed multiple times without being recompiled.

7. An application programming interface (API) for a database query system in an object oriented programming environment, the application programming interface adapt to effect the steps comprising:

creating a condition filter for a standard query language (SQL) WHERE clause statement, the condition filter defining properties to be satisfied by a result of a query, wherein a portion of data values in the condition filter are each replaced by a placeholder and a corresponding data value list for the placeholders is created using a tree data structure to store condition, wherein said condition filter includes parameters and none of the parameters is null, and wherein data values in the condition filter for a SQL WHERE clause statement are replaced with a question mark character and a corresponding data value list is created; and passing the condition filter to a persistent object framework, wherein the SQL WHERE clause statement uses a Preparedstatement object to request a query that uses the tree data structure to set values of the unknown parameters unknown, and wherein the query is executed multiple times without being recompiled.

8. A computer program product comprising a computer useable medium having computer readable code embodied therein for a database query system in an object oriented programming environment, the computer program product adapted to effect the steps comprising:

making a connection with a database, creating a condition filter in a standard query language statement, the condition filter defining properties to be satisfied by a result of a query, and the condition filter using an object to execute a precompilied query language statement, wherein a portion of data values in the condition filter are each replaced by a placeholder and a corresponding data value list for the placeholders is created using a tree data structure to store condition, wherein the query language statement is executed mutiple times without being recompiled, and wherein the tree data structure is used for storing conditions, the tree data structure being accessible by the executing object for the condition filter to set the parameters with the parameter values; and using the precompiled standard query language statement to request the result of the query from the database, wherein the precompiled standard query comprises the step of responding to an access request from an application, the access request including values of parameters implemented in the standard query language statement by the object and wherein said data value list being used to implement the parameter values from the application.

9. The computer program product according to claim 8, wherein the condition filter includes LIKE, AND, and OR operators.

10. The computer program product according to claim 8, wherein the condition filter includes one of IS NULL and IS NOT NULL functions.

11. The computer program product according to claim 8, wherein the condition filter includes one of UPPER, LOWER, and INITCAP functions.

12. The computer program product according to claim 8, wherein the condition filter includes TO_DATE function.

13. The computer program product according to claim 8, wherein the condition filter has parameters and none of the parameters is null.

* * * * *

UNITED STATES PATENT AND TRADEMARK OFFICE
CERTIFICATE OF CORRECTION

PATENT NO. : 6,925,472 B2
DATED : August 2, 2005
INVENTOR(S) : James X. Kong

It is certified that error appears in the above-identified patent and that said Letters Patent is hereby corrected as shown below:

Column 10,
Line 44, "precompling" should be -- precompiling --.
Line 45, ":" should be -- ; --.

Column 11,
Line 24, "adapt" should be -- adapting --.

Column 12,
Line 6, "," should be -- ; --.

Signed and Sealed this

First Day of November, 2005

JON W. DUDAS
*Director of the United States Patent and Trademark Office*